United States Patent
Touzo

(10) Patent No.: US 10,196,306 B2
(45) Date of Patent: *Feb. 5, 2019

(54) ULTRA-FAST SETTING CEMENT BASED ON AMORPHOUS CALCIUM ALUMINATE

(71) Applicant: KERNEOS, Puteaux (FR)

(72) Inventor: Bruno Touzo, Meyzieu (FR)

(73) Assignee: KERNEOS, Puteaux (FR)

( * ) Notice: Subject to any disclaimer, the term of this patent is extended or adjusted under 35 U.S.C. 154(b) by 0 days.

This patent is subject to a terminal disclaimer.

(21) Appl. No.: 15/311,292

(22) PCT Filed: May 13, 2015

(86) PCT No.: PCT/FR2015/051275
§ 371 (c)(1),
(2) Date: Nov. 15, 2016

(87) PCT Pub. No.: WO2015/173525
PCT Pub. Date: Nov. 19, 2015

(65) Prior Publication Data
US 2017/0088465 A1   Mar. 30, 2017

(30) Foreign Application Priority Data

May 16, 2014 (FR) .................... 14 54425

(51) Int. Cl.
| | |
|---|---|
| *C04B 24/04* | (2006.01) |
| *C04B 28/06* | (2006.01) |
| *C04B 28/14* | (2006.01) |
| *C04B 20/10* | (2006.01) |
| *C04B 14/04* | (2006.01) |
| *C04B 14/30* | (2006.01) |
| *C04B 28/04* | (2006.01) |
| *C04B 40/00* | (2006.01) |
| *C04B 103/12* | (2006.01) |

(52) U.S. Cl.
CPC .............. *C04B 24/04* (2013.01); *C04B 14/04* (2013.01); *C04B 14/308* (2013.01); *C04B 20/1022* (2013.01); *C04B 28/04* (2013.01); *C04B 28/06* (2013.01); *C04B 28/14* (2013.01); *C04B 40/0085* (2013.01); *C04B 2103/12* (2013.01)

(58) Field of Classification Search
CPC ......... C04B 24/04; C04B 28/04; C04B 28/06; C04B 28/14; C04B 20/1022; C04B 14/04; C04B 14/308; C04B 40/0085; C04B 2103/12

See application file for complete search history.

(56) References Cited

U.S. PATENT DOCUMENTS

| | | | | |
|---|---|---|---|---|
| 3,180,748 A | * | 4/1965 | Holmgren | ............... C04B 28/06 106/692 |
| 4,595,664 A | * | 6/1986 | Nishino | .................. F23D 14/14 431/326 |
| 7,074,269 B2 | | 7/2006 | Joubert et al. | |
| 2004/0255824 A1 | * | 12/2004 | Joubert | .................. C04B 24/04 106/810 |
| 2006/0070553 A1 | | 4/2006 | Guinot et al. | |
| 2013/0255542 A1 | * | 10/2013 | Clodic | .................... C04B 28/06 106/695 |
| 2014/0338569 A1 | * | 11/2014 | Ostrander | ................. C04B 7/32 106/692 |

FOREIGN PATENT DOCUMENTS

| | | | |
|---|---|---|---|
| CN | 102 765 738 A | | 11/2012 |
| CN | 102765738 A | * | 11/2012 |
| DE | 3420462 A1 | * | 12/1985 |
| EP | 0 081 385 A1 | | 6/1983 |
| JP | 58-193727 A | * | 11/1983 |
| JP | 60-225621 A | * | 11/1985 |
| JP | 2005 040761 A | | 2/2005 |
| JP | 2007 297250 A | | 11/2007 |
| JP | 2010-155737 | | 7/2010 |
| KR | 10200 7001 6170 A | | 2/2007 |
| WO | 03/010109 A1 | | 2/2003 |
| WO | 2004/060828 A2 | | 7/2004 |

OTHER PUBLICATIONS

Denka Kaisha : "Denka SC-1", Accelerator for fast setting and fast hardening cement based products, NEWCHEM, Dec. 31, 2013 (Dec. 31, 2013), XP002732514.
International Search Report, dated Aug. 17, 2015, from corresponding PCT application.

* cited by examiner

*Primary Examiner* — Anthony J Green
(74) *Attorney, Agent, or Firm* — Young & Thompson

(57) ABSTRACT

The present invention relates to an ultra-fast setting cement composition containing at least amorphous calcium aluminate including by weight, as compared to amorphous calcium aluminate total weight:
(a) from 35 to 55% of calcium oxide CaO (C),
(b) from 19 to 55% of alumina $Al_2O_3$ (A),
the C/A molar ratio being higher than or equal to 1.5,
(c) from 0 to 10% of silica $SiO_2$,
with the amorphous calcium aluminate including (d) from 5 to 16% of iron oxide $Fe_2O_3$. Also disclosed is a method to produce the cement composition, as well as to uses thereof.

25 Claims, 1 Drawing Sheet

ULTRA-FAST SETTING CEMENT BASED ON AMORPHOUS CALCIUM ALUMINATE

TECHNICAL FIELD OF THE INVENTION

The present invention relates to the field of ultra-fast setting cements to be used for preparing mortar or concrete. In particular, the present invention relates to an ultra-fast setting cement composition based on amorphous calcium aluminate, to its method of production, as well as to the uses thereof, especially to accelerate the setting of Portland cements or to optimize the ettringite formation.

TECHNICAL BACKGROUND OF THE INVENTION

There are many situations where a regulation of the setting for a mortar or a concrete composition based on Portland cement and/or on calcium aluminate cement is expected. This is the case especially for the building or the repair of civil engineering works, such as street or road pavements, sidewalks. To be also mentioned are maintenance and construction of electric cable networks, pipe networks for gas and water distribution. Repair works for technical facilities often require underground cavities to be dug, which are sources of complications for the users of such facilities. Thus, it is essential for such cavities to be rapidly filled, so that said facilities can be put in service again as soon as possible after the end of the works.

During the recent years, the composition of cement-based systems has changed in favor of concrete formulations with a (very) high initial strength. However such high mechanical resistances often go along with a very fast initial setting (of about a couple of minutes), which makes this type of concrete casting with no additive difficult, or even impossible.

In order to slow down these setting times, set-controlling agents have been developed.

The patent application EP 0081385 discloses an aluminous cement, which setting is inhibited through a set inhibitor, for example boric acid. Aluminous cement setting is caused by the incorporation of a reactivator within the aluminous cement, for example lime, present in an amount ranging from 0.1 to 10% by weight as compared to the aluminous cement weight.

Also known from the state of the art is WO2004/060828, which describes a setting agent for a Portland cement-containing composition. This setting agent comes in an aqueous form and comprises calcium aluminate and, by weight, as compared to such calcium aluminate total weight, from 0.5 to 4% of a set inhibitor and an anti-settling agent. In particular, the set inhibitor of the calcium aluminate-based cement is chosen from boric acid, citric acid or one of their salts.

JP2007-297250 describes an ultra-fast setting cement composition comprising Portland cement, amorphous calcium aluminate with a $CaO/Al_2O_3$ molar ratio between 1.25 and 1.75, anhydrous calcium sulfate and a set-controlling agent (alkali metal aluminate and organic acid).

CN 102 765 738 describes an amorphous calcium aluminate composition, as well as the method for making the same. Amorphous calcium aluminate may be used as an additive for a cement-based composition, so as to improve its setting time or as an additive for steel production. In particular, amorphous calcium aluminate comprises, by weight, as compared to its total weight, from 40 to 60% of CaO (C), from 30 to 60% of $Al_2O_3$ (A), from 0.01 to 1% of S, from 1 to 10% of $SiO_2$, from 0.05 to 3% of $Fe_2O_3$, from 0.01 to 5% of $CaF_2$, from 1 to 10% of MgO, from 0 to 3% of $TiO_2$ and from 0.01 to 1% of P.

JP 2007 297250 describes a cement composition containing Portland cement, amorphous calcium aluminate, anhydrous gypsum (calcium sulfate), alkali metal aluminate and additives (gas-entraining agent), as well as impurities. This document teaches that if the whole amount of impurities is lower than 10%, then these impurities do not affect the amorphous calcium aluminate properties.

KR 10200 7001 6170 describes a set accelerator comprising calcium aluminate (vitrification rate of 80% or higher), gypsum and an alkali metal aluminate.

Although the setting accelerators of the prior art are satisfying, there is still a need for new compositions enabling to regulate the setting of cement and in particular a cement based on amorphous calcium aluminate combined, or not, with Portland cement, which would also be able to preserve the mechanical properties of the thus obtained mortar or concrete.

It is thus an objective of the present invention to provide a new ultra-fast setting cement composition, which avoids, at least partially, the abovementioned drawbacks, and which especially enables to better regulate the setting of cement over time, as compared to the previously mentioned state of the art.

OBJECT OF THE INVENTION

In order to remedy to the abovementioned drawback of the prior art, the present invention provides an ultra-fast setting cement composition comprising at least amorphous calcium aluminate comprising, by weight, as compared to amorphous calcium aluminate total weight:

(a) from 35 to 55% of calcium oxide CaO (C), (b) from 19 to 55% of alumina $Al_2O_3$ (A), the C/A molar ratio being higher than or equal to 1.5, preferably equal to 1.7, (c) from 0 to 10% of silica $SiO_2$, characterized in that said amorphous calcium aluminate comprises (d) from 5 to 16% of iron oxide $Fe_2O_3$.

The applicant surprisingly discovered that a particular iron oxide $Fe_2O_3$ content could enable to regulate the reaction kinetics of the ultra-reactive amorphous calcium aluminates, while preserving the mechanical resistance of the cement obtained and especially its initial strength.

Indeed, when the C/A molar ratio of the amorphous calcium aluminates is high (>1.5), as is the case for the cement composition according to the invention, the hydration reaction of the amorphous calcium aluminates is ultra-fast. Practically, implementing a cement composition based on such compounds may reveal complicated, or even impossible, because of the very quick hardening of the amorphous calcium aluminates (of about ten minutes). As is classically known, it became then desirable to add a set inhibitor, such as boric acid or citric acid so as to delay the setting. However, such an addition may have a negative effect on the development of the mechanical properties and be especially detrimental to the strength build-up in the mortar or in the concrete. In particular, the right addition of a retarder so as to efficiently target the right setting time may be complicated, especially the temperature effect anticipation. Thus, the cement composition of the invention advantageously enables to avoid the use of such a set-controlling agent and therefore provides a better initial mechanical resistance.

Moreover, the cement composition of the invention advantageously enables to reduce the production costs resulting from the use of raw materials less expensive than those used for traditional cement compositions of the prior art, especially those based on amorphous calcium aluminate with a set accelerator or retarder. Indeed, according to the invention, it is no more necessary to add a set inhibitor, or to select raw materials that are very rich in alumina and calcium oxide.

As used herein, a "cement" is intended to mean a hydraulic binder, that is to say a finely ground mineral material which, when mixed together with water, forms a paste, which sets and hardens due to the reaction and to a hydration process and which, once hardened, remains resistant and stable even under water (Standard NF EN 197-1).

For all the description that follows, unless otherwise specified, values mentioned as ranging from "X to Y" or "comprised between X and Y" in the present invention are intended to include values X and Y.

As used herein, "amorphous calcium aluminate" is intended to mean that calcium aluminate comprises a rate of at least 60% amorphous phase and therefore a crystallization phase rate lower than or equal to 40% of the crystalline phase. In the context of the present invention, a rate of at least 60% amorphous phase is intended to mean at least 65%, at least 70%, at least 75%, at least 80%, at least 85%, at least 90%, at least 95%, at least 97%, at least 98%, at least 99%.

The crystalline phases may be $CaO.Al_2O_3$, $CaO.2Al_2O_3$, $3CaO.Al_2O_3$, $3CaO.3Al_2O_3+CaF_2$, $11CaO.7Al_2O_3.CaF_2$, $12CaO.7Al_2O_3$ or $3CaO.3Al_2O_3+CaSO_4$ or one of their combinations. Preferably, the crystalline phases are $CaO.Al_2O_3$, or $12CaO.7Al_2O_3$ or one of their combinations.

Other non-limiting and advantageous characteristics of the composition according to the invention, either considered individually or according to any technically possible combination, will be described hereunder.

The present invention further relates to a method for producing an ultra-fast setting cement composition, such as described hereabove, comprising the following steps:

i) introducing into a furnace for melting raw material sources at least calcium oxide, alumina and iron oxide;

ii) curing in the melting furnace at a minimum temperature enabling the melting of the composition, in general around 1250° C., and up to 2300° C., within a time period making it possible to achieve the complete melting of the raw materials, typically from 10 minutes to 10 hours, so as to form a liquid calcium aluminate clinker;

iii) recovering said liquid calcium aluminate clinker right at the furnace outlet with a temperature generally ranging from 1000° C. to 1600° C.;

iv) cooling down after curing of said liquid calcium aluminate-based clinker, so as to suddenly lower the temperature of the calcium aluminate-based clinker to a temperature below its crystallization temperature (which is typically of at least 1200° C.) and to obtain amorphous calcium aluminate;

v) optionally grinding the amorphous calcium aluminate-based clinker obtained in step iv) optionally with calcium sulfate.

Lastly, the present invention also relates to the use of the ultra-fast setting cement composition to accelerate the setting of Portland cements, as well as to form ettringite, especially when amorphous calcium aluminate is combined with calcium sulfate.

DETAILED DESCRIPTION OF AN EMBODIMENT

The description which follows by reference to the appended drawings, given as non-limiting examples, will better explain the content of the present invention and the way it may be implemented.

Figure 1:
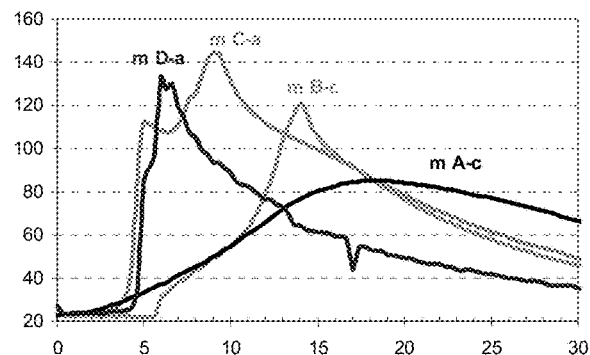
FIG. 1 is a diagram illustrating the temperature increase in ° C. of four mortar compositions: m C-a according to the invention, m D-a which, is also based on amorphous calcium aluminate but with a lower iron content, m A-c and m B-c as comparative compositions, which are crystallized calcium aluminates, as a function of time in minutes (exothermic reaction)

The applicant focused on the development of new cement compositions based on highly reactive amorphous calcium aluminate adapted to the requirements of the building professionals, that is to say provided with high mechanical properties, while enabling the casting of such concrete or mortar produced from this type of cement without requiring the addition of traditional set-controlling agents.

As previously indicated, the present invention relates to an ultra-fast setting cement composition comprising at least amorphous calcium aluminate comprising by weight, as compared to amorphous calcium aluminate total weight:

(a) from 35 to 55% of calcium oxide CaO (C),
(b) from 19 to 55% of alumina $Al_2O_3$ (A), the C/A molar ratio being higher than or equal to 1.5, preferably 1.7,
(c) from 0 to 10% of silica $SiO_2$, characterized in that said amorphous calcium aluminate comprises (d) from 5 to 16% of iron oxide $Fe_2O_3$.

As used herein, "at least 5% of iron oxide $Fe_2O_3$" includes all the following weight percentages: 5%, 5.5%, 6%, 6.5%, 7%, 7.5%, 8%, 8.5%, 9%, 9.5%, 10%, 10.5%, 11%, 11.5%, 12%, 12.5%, 13%, 13.5%, 14%, 14.5%, 15%, 15.5%, 16%.

Thus, contrary to what could have been expected by a person skilled in the art, a relatively high iron oxide content within the cement composition does not impair the ultra-reactivity of amorphous calcium aluminate, but simply enables to regulate the setting thereof, while enabling to obtain a highly reliable mortar composition.

Furthermore, using a mortar or concrete, which rapidly acquires mechanical strengths is economically advantageous.

According to the invention, calcium aluminate present in the cement composition is rich in iron. In particular, amorphous calcium aluminate may comprise, by weight, as compared to calcium aluminate total weight: (d) from 5 to 15%, and more preferably from 5 to 10%, most preferably from 5 to 8% of iron oxide.

In particular, amorphous calcium aluminate comprises by weight as compared to its total weight (a) from 35 to 55%, preferably from 42 to 52%, and more preferably from 47 to 51% of calcium oxide.

When the calcium oxide content is lower than 35% by weight, the cement composition according to the invention is less reactive; whereas when calcium oxide content is higher than 55%, it becomes more difficult to make the compound melt in a melting furnace and in particular in a reverberatory furnace.

Typically, amorphous calcium aluminate may comprise by weight, as compared to its total weight, (b) from 19 to 55%, preferably from 25 to 48%, and even more preferably from 34 to 42% of alumina.

The alumina content depends in particular on the calcium oxide content and should be such that the C/A molar ratio be higher than or equal to 1.5, preferably higher than or equal to 2 and most preferably ranging from 1.5 to 3.

Furthermore, amorphous calcium aluminate may comprise by weight as compared to its total weight from 1 to 8% and more particularly from 3 to 6% of silica $SiO_2$.

The amorphous calcium aluminate according to the invention may comprise impurities (different from abovementioned (a) to (d) compounds) ranging from 0 to 5%, preferably from 0 to 3% by weight, as compared to aluminate calcium total weight. These impurities may be for example titanium oxide ($TiO_2$) or magnesia (MgO).

According to a characteristic of the invention, calcium aluminate present in the cement composition according to the invention has a dissolution rate in water higher than or equal to $15.10^{-6}$ mol·s$^{-1}$·m$^{-2}$, preferably higher than or equal to $20.10^{-6}$ mol·s$^{-1}$·m$^{-2}$.

This rate is measured through determination of the calcium released in water within 5 minutes by calcium aluminate in a slurry at 0.5 g·l$^{-1}$. The calcium concentration is divided by 300 seconds (5 minutes) and by the calcium aluminate surface calculated by the product of the BET surface area, expressed in m$^2$·g$^{-1}$, and of the material weight (0.5 g for 1 liter).

According to a further characteristic of the invention, calcium aluminate has a specific surface area (Blaine value) measured according to Standard NF EN 196-6 ranging from 2000 to 7000 cm$^2$/g and preferably ranging from 3000 to 5000 cm$^2$/g.

According to a further characteristic of the invention, the cement composition has a specific gravity ranging from 2 to 5 g/cm$^3$, preferably ranging from 2.5 to 3.5 g/cm$^3$ and most preferably ranging from 2.7 to 3.1 g/cm$^3$.

Typically, calcium sulfate is in the form of anhydrite, gypsum or hemi-hydrate, of natural or synthetic origin. Preferably, calcium sulfate is in the form of anhydrite.

Advantageously, the cement composition comprises, by weight, as compared to the cement composition total weight, from 30 to 70% of amorphous calcium aluminate, such as previously defined, and from 40 to 60% of calcium sulfate, in particular the cement composition according to the invention may comprise from 45 to 55% of amorphous calcium aluminate and from 45 to 55% of calcium sulfate. A mortar or a concrete composed of this type of compounds, that is to say of amorphous calcium aluminate such as previously described and of calcium sulfate, has many advantages as compared to a traditional composition, the main advantages being a fast setting time and a fast development of strengths, as well as a suitable shrinkage compensation. These advantages are bound to the hydration process and especially to the presence of calcium sulfate, in hemihydrate and anhydrous form.

The cement composition may also comprise an anti-ageing surface treatment.

The applicant also surprisingly discovered that an organic compound having at least two hydrophilic functions and one hydrophobic chain makes it possible to improve the service life of an amorphous calcium aluminate-based cement, while preserving the reactivity or the mechanical resistance of the cement obtained.

Such an organic compound may correspond to the one described in WO 03/010109 relating to non-amorphous hydraulic binders. But, as mentioned hereabove, amorphous calcium aluminates according to the invention have surface properties, which are very different from those of crystalline hydraulic binders, and in particular they have a much higher dissolution rate, which could compromise for the cement composition of the invention the possibility of being coated with such an anti-ageing surface agent.

The weight concentration of such organic compound within the cement composition advantageously ranges from 0.025 to 5% by weight as compared to the cement composition weight, preferably from 0.05% to 2.5%, more preferably from 0.1% to 1%.

As used herein, functions with a "hydrophilic character" is intended to mean functions which enable to ensure the compatibility with a water-containing medium. In addition, these hydrophilic functions are advantageously capable of reacting with cations or metallic elements present in the hydraulic binder.

Functions, which may be suitably used in the present invention are especially carboxylic acid, acid anhydride, acid halide and primary amine functions.

Preferred functions of the invention are acid functions and acid anhydride functions.

The hydrophobic character of the organic product is provided by an aliphatic, aromatic, alkylaromatic or arylaliphatic hydrocarbon chain. Aliphatic, arylaliphatic, linear, cyclic, branched or substituted chains are preferred for the present invention. They advantageously comprise from 2 to 13 carbon atoms.

As will be described hereafter in the following description of the method of the invention, the organic compound in a first embodiment is introduced into the cement composition according to the invention during a co-grinding step of said organic compound as a powder and of an amorphous calcium aluminate-based clinker according to the invention (that is to say, with a high iron oxide content). In a second embodiment, said organic compound is hot blended together with an amorphous calcium aluminate-based clinker at a temperature higher than the melting temperature of said organic compound and at a temperature lower than its decomposition temperature, prior to being ground.

Organic compounds with a film-forming character will be therefore preferred.

However, this property is preferably only desired. Thus, an organic compound without any film-forming character but with a wetting property and able to adsorb on the hydraulic binder grains is also suitable for the invention.

To be mentioned as organic compounds that may be suitably used in the present invention are polycarboxylic acids like dicarboxylic acids such as glutaric acid, succinic acid, adipic acid, octanedioic acid, decanedioic acid, dodecanedioic acid, brassylic acid and their anhydrides and acid halides, phthalic acids such as orthophthalic acid, terephthalic acid or isophthalic acid. Adipic acid is in particular preferred.

It can also be envisaged, without departing from the scope of the present invention to use acids as mixtures and more particularly to use a combination of adipic, succinic and glutaric acids. Such mixture is a by-product of adipic acid production in industrial processes.

The amorphous calcium aluminates thus coated with the anti-ageing organic compound of the invention are less sensitive to moisture regain, thus enabling to increase their shelf life in various conditioning options, such as silos, bags, containers, for example. In addition, the powder flowability is improved when emptying the containers.

The present invention further relates to a method for producing the cement composition of the invention.

In particular the method for preparing an ultra-fast setting cement composition comprises the following steps:

i) introducing into a furnace for melting raw material sources at least calcium oxide, alumina and iron oxide;

ii) curing in the melting furnace at a minimum temperature enabling the melting of the composition, in general around 1250° C., and up to 2300° C., within a time period making it possible to achieve the complete melting of the raw materials, typically from 10 minutes to 10 hours, so as to form a liquid calcium aluminate clinker;

iii) recovering said liquid calcium aluminate clinker right at the furnace outlet at a temperature typically ranging from 1000 to 1600° C.;

iv) cooling down after curing of said liquid calcium aluminate-based clinker, so as to suddenly lower the temperature of the calcium aluminate-based clinker to a temperature below its crystallization temperature to obtain an amorphous calcium aluminate-based clinker;

v) optionally grinding the amorphous calcium aluminate-based clinker obtained in step iv) so as to obtain a calcium aluminate-based cement optionally with calcium sulfate and/or an anti-ageing agent composed of an organic agent (such as described hereabove); and vi) optionally combining the calcium aluminate-based cement obtained in step v) with calcium sulfate and/or optionally adding an organic compound so as to obtain an amorphous calcium aluminate-based cement provided with an anti-ageing surface treatment, if they have not been added during step v).

According to a first alternative embodiment, calcium sulfate and/or the anti-ageing organic compound may be combined with the amorphous calcium aluminate clinker during grinding step v). Generally the organic compound comes as a powder, for example with an average particle size lower than or equal to 300 μm, so as to obtain a calcium aluminate-based cement comprising an anti-ageing surface treatment.

According to another alternative embodiment, these compounds may be combined with the calcium aluminate-based cement obtained at the end of grinding step v).

Generally, the organic compound (such as defined hereabove) is hot-blended with the calcium aluminate-containing cement at a temperature higher than the melting temperature of said organic compound and at a temperature lower than its decomposition temperature. These temperatures or temperature ranges of course depend on the nature of the organic compound.

According to the method of the invention, the calcium source may be selected from limestone, lime and by-products resulting from methods using limestone and lime, like clinker or other slags derived from steel production or electrometallurgy, or one of their combinations; whereas the alumina source and also the iron oxide source may be chosen from bauxite (bauxite monohydrate and/or bauxite trihydrate), corundum wheels, catalyst substrates, fire bricks, hydroxides, metallurgical grade aluminas, calcinated aluminas and fused aluminas, by-products of the aluminum processing and offgrades with a high alumina content, or one of their combinations.

For example, bauxite trihydrate may comprise by weight, from 46 to 50% of alumina, from 14 to 20% of iron oxide and from 7 to 12% of silica. It is then both source of alumina and of iron oxide.

These raw materials that are sources of calcium oxide, of aluminum or iron generally come as blocks, such as bauxite or limestone blocks.

Typically, from 30 to 50%, preferably from 35 to 45% and most preferably 40% by weight of the calcium oxide source and from 50 to 70%, preferably from 55 to 65% and most preferably 60% by weight of the alumina source (bauxite block) are introduced into the furnace, as compared to the calcium oxide and alumina source total weight.

In particular, the melting furnace used in the method of the invention is generally a reverberatory furnace.

A reverberatory furnace has for example a L-section, that is to say a vertical part and a horizontal part which communicate with each other. The vertical part may reach as high as several meters.

Generally, limestone and bauxite blocks are introduced into the melting furnace through an aperture located on the upper portion of the vertical part. These blocks are loaded into the furnace so as to fully occupy the volume of this vertical part and they thus form, at a junction between horizontal part and vertical part, a slope-shaped pile of blocks. The latter is then attacked by a flame located in the furnace horizontal part, in front of the slope-shaped pile. The flame heats at a temperature above 1500° C., or even above 2000° C. It thus brings the required calories so as to make limestone and bauxite blocks melt, thus forming a material liquid bath. The raw material temperature in the furnace typically reaches up to 1400-1500° C. The materials, once melted, are discharged through a tap hole located in the horizontal part of the furnace.

During the process, combustion gases develop and go a counter-current path as compared to the blocks. They are then discharged through a gas stack located in the upper portion of the furnace vertical part. These gases, with a temperature of about 1500° C., thus circulate between the blocks above the slope-shaped pile and pre-heat the blocks through the transfer of heat.

The raw material blocks, from the moment when they are introduced to the contact with the flame, thus undergo beforehand a drying process, then a dehydration and a decarbonation mediated by the combustion gases going up the vertical part of the furnace. The preheating of the raw materials by the combustion gases is made possible due to the porous stacking of the bauxite and limestone blocks, which large enough diameter allows the gases to flow therethrough.

Thus, the firing of the raw materials sources of at least calcium oxide, alumina and iron oxide is effected at a temperature ranging preferably from 1250 to 2300° C., preferably from 1300 to 2000° C. and typically from 1400 to 1600° C., within a time period ranging preferably from 5 to 12 hours, in particular from 6 to 10 hours.

At the outlet of the furnace, a calcium aluminate clinker is thus obtained. This clinker is quenched immediately after the firing, so as to obtain an amorphous calcium aluminate-based clinker.

Preferably, the cooling down may be conducted with a gradient of from 10 to 25° C./second, preferably of from 15 to 20° C./second.

As an example, the quenching may be effected by air quenching the liquid clinker with a temperature of air not exceeding 500° C., preferably not exceeding 100° C. within a time period lower than or equal to 1 minute, advantageously lower than or equal to 15 seconds. For example, a horizontal air blast will be provided at the outlet of the furnace to blow and disperse the clinker in order to accelerate the cooling down thereof.

Once cooled down, the amorphous calcium aluminate-based clinker may be finely ground to obtain an amorphous calcium aluminate-based (hydraulic binder) cement, with an average particle size lower than or equal to 500 μm.

According to an alternative embodiment, the calcium aluminate clinker may be co-ground with calcium sulfate so as to form an amorphous calcium sulfo-aluminate cement.

According to another alternative embodiment, calcium sulfate may be combined with the amorphous calcium aluminate-based cement, beforehand ground at the end of step v).

When the method of production of a cement composition according to the invention comprises a step of calcium sulfate addition, the cement composition comprises preferably by weight, as compared to the cement composition total weight, from 40 to 60% of amorphous calcium aluminate (such as defined hereabove) and from 40 to 60% of calcium sulfate, in particular the cement composition according to the invention may comprise from 45 to 55% of amorphous calcium aluminate and from 45 to 55% of calcium sulfate.

This method enables for example to prepare a cement composition based on amorphous calcium aluminates that are rich in iron oxide $Fe_2O_3$, such as described hereabove. Of course, the cement composition prepared according to this method has the same characteristics as the composition according to the invention. Those characteristics, because they have already been previously addressed, will not be described in more details hereafter.

It is a further object of the present invention to provide the use of the ultra-fast setting cement composition such as described hereabove to accelerate the setting of Portland cements.

Any Portland cement can be suitably used, such as normal Portland cement, fast-setting Portland cement, ultra-fast setting Portland cement, white Portland cement, etc.

The amount of cement composition according to the invention to be added for such a use preferably varies from 8 to 20% by weight of the Portland cement weight, depending on the nature of the other components used and on the expected characteristics. The nature of the Portland, first of all its C3A content, its fineness, the addition types and the nature of calcium sulfate in the cement composition of the invention, if any, or the nature of calcium sulfate present in the Portland, will determine the amount to be added.

The cement composition of the invention, because of the chemical structure (amorphous calcium aluminate rich in iron oxide combined, or not, with calcium sulfate), because of the amorphous and fine character thereof provide calcium aluminate with a strong reactivity. The combination rate with Portland cement's sulfates will be higher and faster than with classical calcium aluminates (crystallized). Moreover, the presence of calcium sulfate anhydrite enables to rapidly obtain resistances through the ettringite formation complementary to the hydrated phases of the Portland. Thus, the efficiency of the cement composition of the invention is higher than that of a traditional calcium aluminate and the required amounts for the same fastness are not so high.

Furthermore, it is an object of the present invention to provide the use of the ultra-fast setting cement composition such as described hereabove to form ettringite when it comprises calcium sulfate.

The cement composition according to the invention may also be used for preparing mortar or concrete compositions.

A mortar composition generally is in the form of a ready-to-use dry powder and may comprise at least the cement composition such as described hereabove as a hydraulic binder, and at least one aggregate, as well as optionally one additive and/or common admixture.

For example, a dry mortar or dry concrete composition comprises, by weight, as compared to said mortar composition total weight:

from 15 to 50%, preferably from 30 to 40% of a hydraulic binder, such as the cement composition according to the invention and/or a Portland cement, from 25 to 80%, preferably from 50 to 70% of mineral fillers, from 0 to 2%, preferably from 0.05 to 0.5% of a fluidizing composition, from 0 to 5% of other additives (accelerators, retarders, antifoams, air-entraining agents, concrete workability-modifying agents, water-repellent agents). The latter are known from the person skilled in the art.

As previously indicated, since the cement composition according to the invention may be rich in iron oxide capable of regulating the setting of the hydraulic binder (calcium aluminate with or without calcium sulfate), it is not necessarily required to add a setting retarder to the dry mortar or concrete composition.

As is well known, mortar comprises a combination of cement and sand/fillers, whereas the concrete may in addition contain some aggregates, each in proportions known from the person skilled in the art.

The following examples are intended to illustrate the invention without limiting the same. Unless otherwise specified in the following description, percentages are expressed by weight.

EXAMPLES

Example 1

A) Preparation of Cement Compositions

One cement composition according to the invention (C-a) and three comparative compositions (A-c; B-c and D-a) have been prepared: A-c and B-c are traditional (crystallized) calcium aluminate-based cements, whereas D-a is a calcium aluminate-based cement made amorphous but containing iron oxide $Fe_2O_3$ as traces (0.7% by weight).

All the cements have been obtained through a melting process in a reverberatory melting furnace within a time period of 8h at a temperature of 1500° C. Clinkers C-a and D-a at the outlet of the furnace did undergo a quenching of an air flow of 20° C. for 15 seconds so as to obtain an amorphous calcium aluminate-based clinker, whereas clinkers A-c and B-c did undergo a slow cooling-down. Clinkers have thereafter been ground so as to obtain a specific surface area (Blaine value) of 5000 cm$^2$/g.

The various formulations of the compositions are given in Table 1 hereunder:

TABLE 1

| | Weight % | | | | |
| --- | --- | --- | --- | --- | --- |
| | CaO | $Al_2O_3$ | $SiO_2$ | $Fe_2O_3$ | Others |
| C-a | 47.4 | 38 | 4.7 | 7.2 | 2.8 |
| A-c | 38.6 | 39 | 4.5 | 15.2 | 2.7 |
| B-c | 47.7 | 37.8 | 4.2 | 7.6 | 2.7 |
| D-a | 51.4 | 39.1 | 5.7 | 0.7 | 2.5 |

The tested cements have the following mineralogic phases:

TABLE 2

| Type | Phases (%) | | | | | | | |
|------|-----|------|-----|-----|-----|---------|------|-------|
|      | NC* | C12A7 | CA | C3A | C2S | C4AF/CT | C2AS | Spinel |
| C-a  | 98  | 2    | 0   | 0   | 0   | 0       | 0    | 0     |
| A-c  | 0   | 4    | 57  | 0   | 12  | 19      | 2    | 6     |
| B-c  | 0   | 61   | 0   | 0   | 16  | 23      | 0    | 0     |
| D-a  | 99  | 0    | 0   | 1   | 0   | 0       | 0    | 0     |

*NC: non crystallized

B) Preparation of the Mortar Compositions

The four hereabove cement compositions have been used to prepare four mortar compositions, which formulations are given in following Table 3:

TABLE 3

| | | Amounts (weight %) | | | |
|---|---|---|---|---|---|
| Compounds | Functions | m A-c | m B-c | m C-a | m D-a |
| A-c | binder | 60 | — | — | — |
| B-c |  | — | 60 | — | — |
| C-a |  | — | — | 60 | — |
| D-a |  | — | — | — | 60 |
| NE 14 | sand | | | To 100 | |
| Conpac500 | superplasticizer (Peramin) | | | 0.2 | |
| Citric acid | set inhibitor | — | — | — | 0.05 |
| Lithium carbonate | set accelerator | 0.4 | 0.15 | — | — |
| Water | | 13 | 16 | 13 | 14 |

The setting time for these four formulations was set to 3 minutes through the use of set-controlling agents and the water amount was defined so as to obtain the same aspect for the various tested mortar compositions.

C) Characterizations

Exothermic Profiles

Mortars are hand-blended for 30 seconds, then 30 g of the blended material are immediately poured into a cylindrical plastic container (25 mm×100 mm, diameter×height) containing a thermocouple type K connected to a temperature recording device, Testo 177.

Tensile Tests

For practical reasons due to the very short setting time of the tested compositions, the initial strength has been measured by primarily using a tensile test requiring less material.

For each test, a standardized concrete slab (30×30×10 cm, Rocholl Gmbh) is used. 9 holes 10 mm×70 mm (diameter × height) are drilled in each slab. Dust is removed from each hole, which is then was saturated with water for 5 minutes. Before the tensile test, the water in excess is removed from the hole and the mortar composition to be tested is cast in the hole after blending. Thereafter, a steel frame (8 mm×90 mm, diameter × height) is immediately plunged into the mortar and connected to a dynamometer for measuring breaking load as a function of time.

D) Results

As indicated hereabove, exothermic profiles have been effected for mortars, which setting time has been adjusted so as to obtain a similar reactivity of about 3 to 6 minutes, which was considered as being long enough to incorporate the steel frame and short enough to provide an ultra-fast hardening.

Thus, the mortars obtained from cements "A-c" and "B-c" have been accelerated with $Li_2CO_3$. Mortar obtained from cement "D-a" has been retarded with citric acid, whereas no traditional set-controlling agent was used for the mortar obtained according to the invention from cement <<C-a>>.

Figure 2:
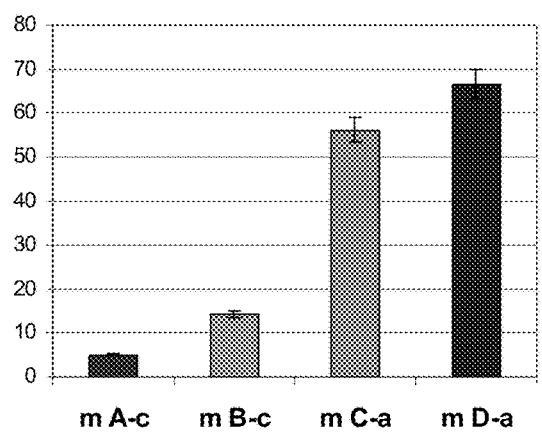
FIG. 2 is a diagram illustrating the heating rate in ° C. of the four mortar compositions m C-a, m D-a, m A-c and m B-c, calculated during the exothermic reaction illustrated on FIG. 1.

The collected data are summarized on FIG. 1, whereas FIG. 2 illustrates the heating rate calculated from this experiment (from the occurrence of the first maximum temperature in the peak).

The corresponding exothermic profiles over time for all the mortars enable to make a classification in two main groups, as a function of the temperature curve shape:
- mortars obtained from cements "B-c" and "A-c", wherein a slight increase in temperature could be observed within the first 10 minutes, as well as a low temperature kinetics (5° C./min and 14° C./min for "A-c" and "B-c", respectively).
- mortars obtained from cements "D-a" and "C-a", which present a sudden rise in the exothermic profile immediately after the begin of the temperature increase, as well as a high temperature kinetics (66.5° C./min and 56° C./min for "D-a" and "C-a", respectively).

Figure 3:
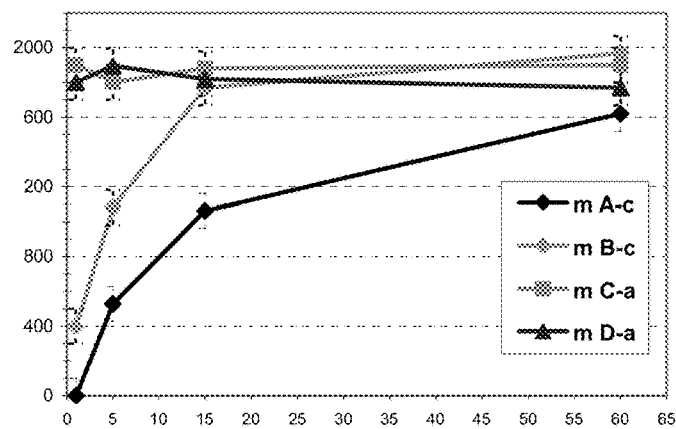
FIG. 3 is a diagram illustrating tensile strengths measured in daN as a function of time in minutes during the tensile strength test of the four mortar compositions m C-a, m D-a, m A-c and m B-c.

FIG. 3 illustrates the results of the tensile test.

As regards the mortars obtained from cements "A-c" and "B-c", tensile load slowly increases within the first 15 minutes with 1063 daN for mortar "A-c" and 1770 daN for mortar <<B-c>>. As a comparison, 1800 daN values are obtained within just one minute after exposure to tensile stress for mortars obtained from cements "C-a" and "D-a". This tensile stress value does not significantly change thereafter, which demonstrates the ultra-reactivity of these two binders.

Example 2

A cement composition according to the invention provided with an anti-ageing surface treatment, i.e. B3, and a composition according to the invention with no anti-ageing treatment, i.e. A3, have been prepared.

As previously, cements have been obtained through a melting process in a reverberatory melting furnace within a time period of 8h at a temperature of 1500° C. Clinkers at the outlet of the furnace did undergo a quenching of an air flow of 20° C. for 15 seconds so as to obtain an amorphous calcium aluminate-based clinker. Clinkers have thereafter been ground so as to obtain a specific surface area (Blaine value) of 3000 cm²/g, depending on the tested compositions.

The formulations of these compositions are given in following Table 4:

TABLE 4

| Examples of cement compositions | CaO | $Al_2O_3$ | $SiO_2$ | $Fe_2O_3$ | Others | Blaine fineness (cm²/g) | Surface treatment (weight % as compared to the cement composition weight) |
|---|---|---|---|---|---|---|---|
| A3 | 47.5 | 36.5 | 4.4 | 7.2 | 4.4 | 3000 | none |
| B3 | 47.5 | 36.5 | 4.4 | 7.2 | 4.4 | 3000 | 0.1% adipic acid and 0.2% paraffin |

The weight regain assay is carried out on cement alone (A3 or B3) using an aluminum cup filled with 25 grams of test cement. The thus prepared cup is weighed and placed under temperature 20° C. and 70% relative humidity. The weight regain test consists in monitoring the cup weight evolution as a function of exposure time. The result is expressed in weight regain %, as compared to the cement weight.

The applicant discovered that the addition of an anti-ageing agent enables to reduce the weight regain after 13 days of storage at 20° C. and 70% relative humidity by more than 70% (71%) for compositions B3 as compared to A3, respectively.

Thus, the cement compositions according to the invention provided with an anti-ageing agent have a much lower weight regain than the cement compositions according to the prior art.

As a consequence the cement compositions of the invention are less sensitive to moisture and therefore have an improved shelf-life as compared to the cement compositions of the prior art.

Although the present invention has been described in relation to a particular embodiment, it should be understood that in no way it is limited thereto and that it includes all the technical equivalents of the described means, as well as their combinations, provided these all are within the scope of the invention.

The invention claimed is:
1. An ultra-fast setting cement composition comprising:
at least amorphous calcium aluminate comprising by weight, as compared to amorphous calcium aluminate total weight:
(a) from 35 to 55% of calcium oxide CaO (C),
(b) from 19 to 55% of alumina $Al_2O_3$ (A), the C/A molar ratio being higher than or equal to 1.5,
(c) from 0 to 10% of silica $SiO_2$, and
(d) from 5 to 16% iron oxide $Fe_2O_3$,
wherein at least 60% of said amorphous calcium aluminate is in an amorphous phase.
2. The cement composition according to claim 1, further comprising an anti-ageing surface treatment comprising an organic compound, wherein the organic compound comprises at least two hydrophilic functions and one hydrophobic chain.
3. The cement composition according to claim 2, wherein the weight concentration of this organic compound within the cement composition ranges from 0.025% to 5% by weight, as compared to the cement composition weight.
4. The cement composition according to claim 3, wherein the weight concentration of this organic compound within the cement composition ranges from 0.05% to 2.5%, by weight, as compared to the cement composition weight.
5. The cement composition according to claim 2, wherein the organic compound is a compound comprising at least two acid, acid halide or acid anhydride functions.
6. The cement composition according to claim 2, wherein the organic compound is a compound comprising one aliphatic, arylaliphatic, aromatic, or alkylaromatic hydrophobic chain.
7. The cement composition according to claim 6, wherein said hydrophobic chain comprises 2 to 13 carbon atoms.
8. The cement composition according to claim 2, wherein the organic compound is selected from the group consisting of succinic, sebacic, adipic, octanedioic, decanedioic, dodecanedioic, brassylic, glutaric acids and combinations thereof.
9. The composition according to claim 8, wherein the organic compound is a combination of adipic, glutaric and succinic acids.
10. The cement composition according to claim 1, wherein said amorphous calcium aluminate further comprises by weight, as compared to said amorphous aluminate calcium total weight, from 1 to 8% of silica $SiO_2$(c).
11. The cement composition according to claim 1, wherein said amorphous calcium aluminate comprises by weight as compared to said amorphous calcium aluminate total weight from 25 to 48% of alumina (b).
12. The cement composition according to claim 11, wherein said amorphous calcium aluminate comprises by weight as compared to said amorphous calcium aluminate total weight from 34 to 42% of alumina (b).
13. The cement composition according to claim 10, wherein said amorphous calcium aluminate comprises by weight, as compared to said amorphous calcium aluminate total weight from 5 to 10% of iron oxide (d).
14. The cement composition according to claim 1, wherein said amorphous calcium aluminate has a dissolution rate in water higher than or equal to $15.10^{-6}$ $mol \cdot S^{-1} \cdot m^{-2}$.
15. The cement composition according to claim 13, wherein said amorphous calcium aluminate comprises by weight, as compared to said amorphous calcium aluminate total weight, from 5 to 8% of iron oxide (d).
16. The cement composition according to claim 1, further comprising by weight, as compared to the cement composition total weight, from 30 to 70% of calcium sulfate, and wherein said amorphous calcium aluminate is from 30 to 70% by weight, as compared to the cement composition total weight.
17. The cement composition according to claim 1, wherein said amorphous calcium aluminate comprises by weight, as compared to amorphous calcium aluminate total weight, from 42 to 52% of calcium oxide (a).
18. The cement composition according to claim 17, wherein said amorphous calcium aluminate comprises by weight, as compared to amorphous calcium aluminate total weight, from 47 to 51% of calcium oxide (a).
19. The cement composition according to claim 10, wherein said amorphous calcium aluminate comprises by weight, as compared to amorphous calcium aluminate total weight, from 3 to 6% of silica $SiO_2$(c).
20. The cement composition according to claim 1, wherein said amorphous calcium aluminate has a specific surface area (Blaine value) measured according to Standard NF EN196-6 ranging from 2000 to 7000 $cm^2/g$.
21. A method for producing the ultra-fast setting cement composition according to claim 2, comprising the following steps:
i) introducing into a melting furnace for melting raw material sources raw materials comprising at least calcium oxide and alumina;
ii) curing in the melting furnace at a minimum temperature to melt the raw materials for a time period sufficient to achieve a complete melting of the raw materials so as to obtain a liquid calcium aluminate-based clinker;
iii) recovering right at a furnace outlet of the melting furnace said liquid calcium aluminate-based clinker, said calcium aluminate-based clinker having a crystallization temperature below a temperature at which it is recovered;
iv) cooling down after curing of said liquid calcium aluminate-based clinker, so as to suddenly lower the temperature of the calcium aluminate-based clinker at which it is recovered to a temperature below the crystallization temperature of said calcium aluminate-based clinker to obtain amorphous calcium aluminate;

v) grinding the amorphous calcium aluminate-based clinker, so as to obtain a calcium aluminate cement;

vi) adding an organic compound, so as to obtain an amorphous calcium aluminate-based cement provided with an anti-ageing surface treatment.

22. The method according to claim 21, wherein either step vi) is carried out concomitantly to step v) by co-grinding the amorphous calcium aluminate-based clinker with the organic compound coming as a powder, or step vi) is carried out by hot-blending the calcium aluminate-containing cement obtained in step v) with the organic compound at a temperature higher than a temperature at which said organic compound melts and at a temperature lower than a temperature at which said organic compound decomposes.

23. The method according to claim 21, further comprising adding calcium sulfate to the clinker or to the amorphous calcium aluminate-containing cement.

24. The method according to claim 21, wherein the melting furnace is a reverberatory furnace.

25. A method for accelerating the setting of Portland cements, comprising adding to a Portland cement an ultra-fast setting cement composition according to claim 1.

* * * * *